United States Patent
Sun et al.

(10) Patent No.: US 9,413,007 B2
(45) Date of Patent: Aug. 9, 2016

(54) GRAPHENE POWDER, PRODUCTION METHOD THEREOF, AND ELECTROCHEMICAL DEVICE COMPRISING SAME

(75) Inventors: Peiyu Sun, Shanghai (CN); Zhenqi Wu, Shanghai (CN); Gangqiao Liu, Shanghai (CN); Eiichiro Tamaki, Shiga (JP); Yasuo Kubota, Shiga (JP); Gang Wu, Shanghai (CN)

(73) Assignee: TORAY INDUSTRIES, INC., Tokyo (JP)

( * ) Notice: Subject to any disclaimer, the term of this patent is extended or adjusted under 35 U.S.C. 154(b) by 336 days.

(21) Appl. No.: 13/992,937

(22) PCT Filed: Dec. 9, 2011

(86) PCT No.: PCT/CN2011/083738
§ 371 (c)(1),
(2), (4) Date: Jul. 30, 2013

(87) PCT Pub. No.: WO2012/075960
PCT Pub. Date: Jun. 14, 2012

(65) Prior Publication Data
US 2013/0302693 A1  Nov. 14, 2013

(30) Foreign Application Priority Data
Dec. 10, 2010  (CN) .......................... 2010 1 0583268

(51) Int. Cl.
| H01M 4/583 | (2010.01) |
| C01B 31/04 | (2006.01) |
| H01M 4/00 | (2006.01) |
| B82Y 30/00 | (2011.01) |
| B82Y 40/00 | (2011.01) |
| H01M 4/04 | (2006.01) |
| H01M 4/1391 | (2010.01) |
| H01M 4/62 | (2006.01) |
| H01M 10/0525 | (2010.01) |

(52) U.S. Cl.
CPC .............. H01M 4/583 (2013.01); B82Y 30/00 (2013.01); B82Y 40/00 (2013.01); C01B 31/0476 (2013.01); H01M 4/00 (2013.01); H01M 4/625 (2013.01); H01M 4/0409 (2013.01); H01M 4/0471 (2013.01); H01M 4/1391 (2013.01); H01M 4/622 (2013.01); H01M 4/623 (2013.01); H01M 10/0525 (2013.01)

(58) Field of Classification Search
CPC ..... H01M 4/00; H01M 4/1391; H01M 4/583; H01M 4/625; H01M 10/0525; B82Y 40/00; B82Y 30/00; C01B 31/0476
See application file for complete search history.

(56) References Cited

U.S. PATENT DOCUMENTS

2006/0062713 A1* 3/2006 Sano et al. ................. 423/445 R
2010/0105834 A1* 4/2010 Tour et al. ....................... 525/50
2010/0122642 A1  5/2010 Farrugia et al.

FOREIGN PATENT DOCUMENTS

| CN | 101849302 A | 9/2010 |
| CN | 101867046 | 10/2010 |
| CN | 102070142 A | 5/2011 |
| JP | 2010-132901 | 6/2010 |
| WO | 2009/061685 | 5/2009 |
| WO | 2009123771 A2 | 10/2009 |
| WO | WO 2009-123771 | * 10/2009 |
| WO | 2009134492 A2 | 11/2009 |
| WO | 2010/089326 | 8/2010 |

OTHER PUBLICATIONS

Pramanik, Panchanan et al., A Novel Method for Preparation of Graphene and Study of Mechanism of It's Reduction, World Journal of Engineering, Jul. 4-10, 2010, vol. 7, Supplement 2, p. 387.*
Taiwanese Office Action dated Jan. 28, 2015 in corresponding Taiwanese Patent Application No. 100145711 (4 pages).
Japanese Office Action issued Sep. 15, 2015 in corresponding Japanese Patent Application No. 2013-542363 (6 pages).
Peichao Lian, et. al., "Large reversible capacity of high quality graphene sheets as an anode material for lithium-ion batteries", Electrochimica Acta, Apr. 30, 2010, vol. 55, Issue 12, pp. 3909-3914.
G. Srinivas, et al., "Synthesis of graphene-like nanosheets and their hydrogen adsorption capacity", Carbon, Mar. 2010, vol. 48, Issue 3, pp. 630-635.
Dengyu Pan, et al., "Li Storage Properties of Disordered Graphene Nanosheets", Chemistry of Materials, Jul. 6, 2009, vol. 21, Issue 14, pp. 3136-3142.

* cited by examiner

Primary Examiner — Brittany Raymond
(74) Attorney, Agent, or Firm — Pillsbury Winthrop Shaw Pittman LLP

(57) ABSTRACT

Provided are a graphene powder, a production method thereof, and an electrochemical device comprising the same. The graphene powder has an elemental ratio of oxygen atoms to carbon atoms of not less than 0.07 and not more than 0.13 and an elemental ratio of nitrogen atoms to carbon atoms of not more than 0.01. In the production method, the graphene powder is produced by using a dithionous acid salt as a reducing agent. Since the graphene has a low content of nitrogen atoms and a proper amount of oxygen atoms and a proper defect, the graphene is provided with good performance of both dispersibility and conductive property, and is usable as a good conductive additive, such as the one for a lithium ion battery electrode. The production method has the advantages of low cost, high efficiency and low toxicity.

19 Claims, No Drawings

GRAPHENE POWDER, PRODUCTION METHOD THEREOF, AND ELECTROCHEMICAL DEVICE COMPRISING SAME

CROSS REFERENCE TO RELATED APPLICATIONS

This application is the U.S. National Stage of PCT/CN2011/083738, filed Dec. 9, 2011, which in turn claims the benefit of priority from Chinese Patent Application Serial No. 201010583268.4, filed Dec. 10, 2010, the contents of all applications are incorporated herein by reference in their entireties.

TECHNICAL FIELD

The present invention relates to a graphene powder with high dispersibility and high conductivity, and a production method thereof.

BACKGROUND ART

Graphene is a two-dimensional crystal comprised of carbon atoms and has drawn attention since it was found in 2004. Graphene has excellent electric, thermal, optical, and mechanical properties and is expected to be widely applicable in the fields of battery materials, energy storage materials, electronic devices, composite materials, etc. Two professors of the University of Manchester, UK, were awarded the Nobel Prize in Physics in 2010 for the results of their studies on graphene.

As a production method of graphene, there are a mechanical exfoliation method, a chemical vapor deposition method, an epitaxial crystal growth method, a redox method, etc. Among them, the former three methods require complicated processes and have low productivity and are thus difficult for mass production. On the other hand, the redox method has a feature of easiness of mass productivity and chemical modification and has thus drawn attention.

A redox method proposed presently is for producing graphene by reducing graphene oxide with a heat reduction method or a technique using reducing agents such as hydrazines or other organic substances.

The heat reduction method involves heat reduction of graphene oxide at a high temperature of 1050° C. to produce graphene (Patent Document 1). However, the production method requires the high temperature reaction and thus requires facilities at a high cost.

A known example is a method of producing graphene by reducing graphene oxide in a reaction at 100° C. for 24 hours in water, using a hydrazine hydrate as a reducing agent (Non-Patent Document 1). However, reducing agents of hydrazines are deleterious substances and unsuitable for industrially practical use and take a long time for the reaction. Consequently, it is required to seek a simple and highly efficient reduction method with a low poisonous property.

On the other hand, another known example is a method of producing graphene by reducing graphene oxide using an organic substance containing an amino group such as urea as a reducing agent (Patent Document 2). This reaction system is low poisonous, however, urea is an organic substance with a low reduction property and the reduction reaction of graphene oxide is insufficient.

Further, with respect to the properties of the obtained graphene, since the graphene obtained by the heat reduction (Non-Patent Document 2) has high crystallinity, lamination of graphene in the layer direction is easy to occur and agglomeration tends to be caused easily. Further, the graphene obtained by hydrazine reduction has a structure replaced with nitrogen, resulting in occurrence of a problem of a decrease in conductivity.

Unlike the above-mentioned methods, a technique of producing graphene without undergoing graphene oxide has also been proposed. For example, there is a technique of producing graphene by exfoliating interlayer of a graphite intercalation compound by quickly heating the graphite intercalation compound (Non-Patent Document 3). However, the graphene obtained by this technique is graphene which is produced by a technique without undergoing graphene oxide and has a less amount of functional groups to be contained and is not dispersed in a solvent or a resin, so that agglomeration tends to be caused easily.

Further, a technique for producing graphene on a substrate by CVD is also known; however the obtained graphene is not a powder but in the form of a film and the graphene produced by the technique is supposed to have a considerably high agglomeration property even if the grapheme is formed into a powder since it scarcely contains oxygen atoms.

PRIOR ART DOCUMENTS

Patent Documents

Patent Document 1: U.S. Pat. No. 7,658,901
Patent Document 2: Chinese Patent No. 201010108326.8

Non-Patent Document

Non-Patent Document 1: Ruoff, et al. Carbon, 2007, 45, 1558
Non-Patent Document 2: Yang D., et al. Carbon, 2009, 47, 145
Non-Patent Document 3: Kalaitzidou K., et al. Composites: Part A, 2009, 38, 1675

SUMMARY OF THE INVENTION

Problems to be Solved by the Invention

A first object of the present invention is to obtain a graphene powder with high dispersibility and high conductivity.

A second object of the present invention is to provide a method for producing graphene at a high rate and a low cost in a moderate condition so as to solve the problems of existing techniques.

A third object of the present invention is to obtain a high performance electrochemical device, for example, a lithium secondary battery with high capacity and high output.

Solutions to the Problems

The graphene powder of the present invention has a configuration containing a trace amount of functional groups attributed to an oxide and extremely few nitrogen atoms.

Further, the production method of a graphene powder in the present invention provides a graphene powder with high dispersibility and high conductivity by reducing oxygen containing groups on the surface of graphene oxide using a dithionous sulfuric acid salt as a reducing agent.

Still further, the graphene powder obtained by the present invention has good dispersibility and conductivity and is useful for obtaining a lithium secondary battery with high output and high performance.

That is, the present invention includes:

(1) a graphene powder having an elemental ratio of oxygen atoms to carbon atoms of not less than 0.07 and not more than 0.13 and an elemental ratio of nitrogen atoms to carbon atoms of not more than 0.01;

(2) the graphene powder of (1), wherein the ratio of $I_D$ peak intensity to $I_G$ peak intensity measured by Raman spectroscopy is not less than 1 and not more than 2;

(3) the graphene powder of (1), wherein the ratio of $I_{2D}$ peak intensity to $I_G$ peak intensity measured by Raman spectroscopy is not less than 0.1 and not more than 0.2;

(4) the graphene powder of (1), wherein the ratio of the peak area derived from a carbonyl group to the peak area derived from a carbon-carbon double bond measured by IR spectroscopy is not less than 0.1 and not more than 0.5;

(5) a method for producing a graphene powder by reducing graphene oxide, wherein a dithionous acid salt is used as a reducing agent;

(6) the method for producing a graphene powder of (5), wherein the dithionous acid salt is sodium dithionite or potassium dithionite;

(7) the method for producing a graphene powder of (5), wherein the elemental ratio of oxygen atoms to carbon atoms in graphene oxide is not more than 0.5 and no peak peculiar to graphite is detected in an x-ray diffraction spectrum of the graphene oxide;

(8) an electrochemical device containing the graphene powder of (1) at least in part; and (9) the electrochemical device of (8), which is a lithium ion battery.

Advantages of the Invention

The graphene powder of the present invention is provided with high dispersibility and high conductivity and can exhibit an excellent effect as a conductive additive for, for example, a lithium ion battery. A production method of a graphene powder of the present invention can produce a graphene powder rapidly and inexpensively in a moderate condition. The graphene powder obtained by the present invention has good dispersibility and conductivity and makes it possible to obtain a lithium secondary battery with high output and high performance.

MODE FOR CARRYING OUT THE INVENTION

The graphene powder in the present invention is a structure body formed by stacking monolayer graphene and has a flaky form. The thickness thereof is preferably not more than 100 nm, more preferably not more than 50 nm, and particularly preferably not more than 20 nm. The thickness of the graphene powder may be determined by the average thickness of randomly selected 100 particles of the graphene powder measured by SEM or TEM. Further, the graphene powder in the present invention is a graphene powder having no peak peculiar for graphene oxide in 12.5 to 13.0° by x-ray diffractometry.

The graphene powder in the present invention has an elemental ratio of oxygen atoms to carbon atoms of not less than 0.07 and not more than 0.13 and an elemental ratio of nitrogen atoms to carbon atoms of not more than 0.01.

The elemental ratio in the present invention can be measured by x-ray photoelectron spectroscopy. The elemental ratio is measured by radiating a sample surface placed in ultrahigh vacuum with soft x-ray and detecting the photoelectrons emitted out of the surface by an analyzer. Measurement is carried out by wide scanning and the elemental data of a substance can be obtained from the bond energy value of bound electrons in the substance. Further, the elemental ratio can be quantitatively measured using the peak area ratio.

The graphene powder is provided with good dispersibility as having a higher content of oxygen containing groups. However, if the content of oxygen containing groups is too high, the conductivity is worsened. Consequently, good properties cannot be obtained in the case of using the graphene powder as an additive or the like unless the content of oxygen atom is in a certain range. Herein, if the elemental ratio of oxygen atoms to carbon atoms is less than 0.07, agglomeration tends to be caused and if it exceeds 0.13, the conductive property is lowered. Therefore, the elemental ratio of oxygen atoms to carbon atoms in the graphene powder is required to be not less than 0.07 and not more than 0.13. It is more preferably not less than 0.07 and not more than 0.11 and even more preferably not less than 0.08 and not more than 0.10.

Further, if the elemental ratio of nitrogen atoms to carbon atoms exceeds 0.01, it is supposed that nitrogen atoms replace the conjugated structure of graphene to result in a low conductive property. Therefore, the content of nitrogen atom is required to be low. The elemental ratio of nitrogen atoms to carbon atoms is required to be not more than 0.01. It is more preferably not more than 0.005 and even more preferably not more than 0.002.

If the structure defect of the graphene powder in the present invention is too small, lamination in the layer direction tends to be caused and agglomeration is easy to occur. On the other hand, if it is too large, the conductive property is lowered. Consequently, the structure defect of the graphene powder has a preferable range. The structure defect of the graphene powder can be measured by Raman spectroscopy.

The peak intensity ratio of Raman spectroscopy in the present invention is all measured at an excitation wavelength of 514.5 nm using argon ion laser as excitation laser. The graphene powder has peaks at around 1580 cm$^{-1}$ and 1335 cm$^{-1}$ in Raman spectroscopy and the peak intensity at around 1580 cm$^{-1}$ is denoted as $I_G$ and the peak intensity at around 1335 cm$^{-1}$ is denoted as $I_D$.

In the case of a complete graphite crystal, intrinsically no peek of $I_D$ appears, but as the symmetry of the graphite structure is lost, the intensity of the $I_D$ peak is increased. Therefore, as the structure defect of the graphene powder is significant, the peak intensity ratio of $I_G/I_D$ becomes low. In order to have a high conductive property and good dispersibility, the structure defect of the graphene powder is desirably within a preferable range and the peak intensity ratio of $I_D/I_G$ is preferably not less than 1 and not more than 2. It is more preferably not less than 1.3 and not more than 1.8 and particularly preferably not less than 1.45 and not more than 1.7.

Further, the graphene powder also has a peak at around 2678 cm$^{-1}$ in Raman spectroscopy. It is denoted as $I_{2D}$ peak. This peak intensity also reflects the structure defect of the graphene powder and as the $I_{2D}$ peak intensity is strong, the structure defect of the graphene powder is small. The structure defect of the graphene powder is desirably within a preferable range and the peak intensity ratio of $I_{2D}/I_G$ is preferably not less than 0.1 and not more than 1. It is more preferably not less than 0.1 and not more than 0.3 and even more preferably not less than 0.12 and not more than 0.2.

The graphene powder in the present invention is preferable to properly contain carbonyl groups. The ratio of the peak area at around 1750 cm$^{-1}$, which is of a peak derived from the carbonyl group, measured by IR spectroscopy to the peak area at around 1560 cm$^{-1}$, which is of a peak derived from a carbon-carbon double bond, is preferably not less than 0.1 and not more than 0.5. If it is less than 0.1, the number of the carbonyl group is small and the dispersibility may be worsened in some cases. If it is not less than 0.5, the number of the carbonyl group is large and the structure defect of the graphene powder is large and the conductive property may be worsened in some cases.

In the present invention, the number of layers is not limited and those obtained by oxidation of graphite are generally referred to as graphite oxide. Herein, as described below, since the graphene powder is obtained by reducing graphite oxide, the graphite oxide is sometimes referred to as graphene oxide. When graphite is oxidized, the interlayer distance of graphite oxide becomes longer than that of graphite and graphite oxide has a peak at 9° to 13.0° in x-ray diffractometry.

Graphene oxide as a raw material for producing a graphene powder can be produced by a known method. Also, commercialized graphene oxide may be purchased. A production method of graphene oxide employed in the present invention will be exemplified below. Graphite to be a raw material of graphene oxide may be any one of artificial graphite and natural graphite; however natural graphite is employed preferably. The number of mesh of raw material graphite is preferably not more than 20000 and more preferably not more than 5000.

The production method of graphene oxide is preferably a modified Hummers' method. Its example will be described below. Concentrated sulfuric acid, sodium nitrate, and potassium permanganate are added to graphite (e.g., a powder of natural graphite) as a raw material and the mixture is stirred and reacted at 25 to 50° C. for 0.2 to 5 hours. Thereafter, deionized water is added thereto for dilution to obtain a suspension liquid, which is successively subjected to a reaction at 80 to 100° C. for 5 to 50 minutes. Finally, hydrogen peroxide and deionized water are added thereto and a reaction is carried out for 1 to 30 minutes to obtain a graphite oxide dispersion liquid (that is, a graphite oxide dispersion liquid, a graphene oxide dispersion liquid). The graphite oxide dispersion liquid is filtered and washed to obtain graphite oxide gel (that is, graphite oxide gel, graphene oxide gel).

An example of the ratio of the respective reaction substances, that is the ratio of graphite, concentrated sulfuric acid, sodium nitrate, potassium permanganate, and hydrogen peroxide is 10 g:(150 to 300) ml:(2 to 8) g:(10 to 40) g:(40 to 80) g. When concentrated sulfuric acid, sodium nitrate, and potassium permanganate are added, the temperature is controlled by the use of an ice bath. When hydrogen peroxide and deionized water are added, the mass of the deionized water is 10 to 20 times as much as the mass of the hydrogen peroxide. The concentrate sulfuric acid used in the present invention has a content by mass of not less than 70%. It is preferable to use concentrate sulfuric acid of not less than 97%.

Although having high dispersibility, graphene oxide itself has an insulating property and cannot be used as a conductive additive or the like. If the degree of oxidation of the graphene oxide is too high, a graphene powder obtained by reduction may have a conductive property worsened in some cases. Therefore, the ratio of oxygen atoms to carbon atoms in the graphene oxide is preferably not more than 0.5. Further, if the inner part of graphite is not well oxidized, it becomes difficult to obtain a flaky graphene powder when the graphite oxide is reduced. Therefore, the graphene oxide is desirable to have no peak peculiar for graphite when x-ray diffractometry is carried out.

The degree of oxidation of the graphene oxide can be adjusted by changing the amount of an oxidizing agent to be used for the oxidation reaction of graphite. Specifically, the degree of oxidation becomes high as the amounts of sodium nitrate and potassium permanganate, which are used in the oxidation reaction, relative to graphite are high and the degree of oxidation becomes low as they are low. The weight ratio of the sodium nitrate to the graphite is not particularly limited; however it is preferably not less than 0.2 and not more than 0.8, more preferably not less than 0.25 and not more than 0.5, and particularly preferably not less than 0.275 and not more than 0.425. The ratio of the potassium permanganate to the graphite is not particularly limited; however it is preferably not less than 1 and not more than 4, more preferably not less than 1.4, and particularly preferably not less than 1.65. On the other hand, it is more preferably not more than 3 and particularly preferably not more than 2.55.

The graphene powder of the present invention can be produced by, for example, adding a dithionous acid salt as a reducing agent to a graphene oxide dispersion liquid and causing a reaction. The dithionous acid salt is not particularly limited and one or both of sodium dithionite and potassium dithionite are desirable to be employed and particularly, sodium dithionite is preferable.

A commercialized graphene oxide dispersion liquid can be directly used as the graphene oxide dispersion liquid of the present invention. Alternatively, the graphite oxide gel (graphene oxide gel) produced in the above-mentioned preparation method may be diluted with a dispersion solvent and subjected to ultrasonic treatment to obtain a graphene oxide dispersion liquid.

In the present invention, the dispersion solvent to be used for preparing the graphene oxide dispersion liquid is water or a mixed solvent of water and an organic solvent and water is particularly preferable. Examples of the organic solvent include N,N-dimethylformamide, N,N-dimethylacetamide, dimethyl sulfoxide, and N-methylpyrrolidone. One or a plurality of the exemplified solvents may be used. The concentration of the above-mentioned graphene oxide dispersion liquid is preferably 0.1 to 100 mg/ml. It is more preferably 1 to 100 mg/ml and even more preferably 1 to 50 mg/ml.

The reaction temperature and reaction time in the present procedure are not particularly limited; however in consideration of efficiency and cost, the reaction temperature is more preferably 20 to 50° C. Further, with respect to the reaction time, it is preferably not less than 5 minutes since the reaction is sufficiently promoted and it is preferably within 2 hours and more preferably within 30 minutes in terms of cost.

The mass ratio of dithionous acid salt and graphene oxide at the time of the reaction is not particularly limited; however, in consideration of efficiency and cost, the mass ratio of dithionous acid salt and graphene oxide is preferably (0.1 to 10):1, more preferably (0.5 to 5):1, and even more preferably (1 to 3):1.

The graphene powder of the present invention has a configuration containing a trace amount of an oxygen-containing functional group and also extremely a few nitrogen atoms, and having a high conductive property and good dispersibility. The graphene powder of the present invention can be widely applicable in the fields of battery materials, energy storage materials, electronic devices, conductive composites, heat conductive composites, etc.

The production method of graphene of the present invention involves quickly reducing graphene oxide in a moderate condition using a dithionous acid salt as a reducing agent. In this method, if conventional high temperature heat reduction and a reducing agent such as hydrazine are employed, problems such as facilities at a high cost, high temperature and long reaction time, and toxicity can be solved.

The graphene powder in the present invention is preferably used particularly for electrochemical devices. The graphene powder is preferably used for a lithium ion battery as an electronic chemical device, particularly preferably as a conductive additive.

An electrode for a lithium ion battery is comprised of a conductive additive, a positive electrode active material or a negative electrode active material, and a binder polymer.

The conductive additive may be comprised of only the graphene powder of the present invention or other additives may be added thereto. Examples of the other additives to be added include, but are not particularly limited to, carbon blacks such as furnace black, ketjen black, and acetylene black; graphites such as natural graphite (scaly graphite) and artificial graphite; conductive fibers such as carbon fibers and metal fibers; and metal powders of copper, nickel, aluminum, silver, and the like.

Examples of the positive electrode active material include, but are not particularly limited to, lithium metal oxides such as lithium cobaltate ($LiCoO_2$), lithium nickelate ($LiNiO_2$), and spinel type lithium manganate ($LiMn_2O_4$); metal oxides such as $V_2O_5$; metal compounds such as $TiS_2$, $MoS_2$, and $NbSe_2$; and olivines such as iron lithium phosphate and lithium manganese phosphate.

Examples of the negative electrode active material include, but are not particularly limited to, carbon materials such as natural graphite, artificial graphite, and hard carbon; silicon compounds containing SiO, SiC, SiOC or the like as basic constituent elements; and metal oxides such as manganese oxide (MnO) and cobalt oxide (CoO) which can be reactive with a lithium ion in a conversion manner.

The binder polymer may be selected from fluoropolymers such as polyvinylidene fluoride (PVDF) and polytetrafluoroethylene (PTFE); and rubbers such as styrene-butadiene rubber (SBR) and natural rubber.

An electrode for a lithium ion battery can be produced by mixing the above-mentioned active materials, binder polymer, and conductive additive with a proper amount of a solvent and applying and drying the mixture to a current collector. The graphene powder of the present invention has excellent dispersibility and is dispersed well in the inside of an electrode, so that the graphene powder can improve the electron conductivity in the inside of the electrode.

EXAMPLES

Measurement Example 1

X-ray diffraction spectra were measured by D/max-2200/PC model x-ray diffractometer (XRD) manufactured by Rigaku Corporation.

Measurement Example 2

XPS spectra of respective samples were measured by Quantera SXM (manufactured by PHI). Excitation x-ray was monochromatic Al $K_{\alpha1,2}$ ray (1486.6 eV) and the x-ray diameter was 200 μm and the photoelectron escape angle was 45°.

Measurement Example 3

Raman measurement was carried out by Ramanor T-64000 (Jobin Yvon/Atago Bussan Co., Ltd.). The beam diameter was 100 μm and argon ion laser (wavelength: 514.5 nm) was used as a light source.

Measurement Example 4

IR absorptiometry was carried out by ATR method using FTS-60A/896 (FT-IR, manufactured by Bio-Rad Diglab). In the ATR method, a crystal with a high refractive index was press-bonded to a sample surface and measurement was carried out in the total reflection condition. The measurement was carried out using nitrogen gas purge and a Ge prism was used as a prism. The measurement was carried out at an incident angle of 45° and in a measurement range of 4000 to 680 $cm^{-1}$. The refractive index of graphene was assumed to be 2.

Measurement Example 5

The conductivity of a sample was measured by molding the sample in a disk-like specimen with a diameter of about 20 mm and using MCP-HT450 high resistivity meter and MCP-T610 low resistivity meter manufactured by Mitsubishi Chemical Corporation.

Measurement Example 6

The measurement method of a viscosity yield value was as follows. The yield value of a paste was measured by a viscometer (manufactured by Rheotech, Model number RC20). A cone plate (C25-2) was used as a probe and the shear rate was increased step by step for 30 steps at a shear rate of 0 to 500 per second in a temperature condition of 25° C., and the viscosity was measured for the respective steps. The shear rate and the shear stress was plotted by Casson plot and the yield value was calculated from the segment.

Measurement Example 7

The discharge capacity was measured as follows. An electrode paste was obtained by mixing a mixture obtained by adding 2 parts by weight of a graphene powder produced in each example as described below, 80 parts by weight of iron lithium phosphate as an electrode active material, 8 parts by weight of acetylene black as a conductive additive, and 10 parts by weight of polyvinylidene fluoride as a binder with the use of a planetary mixer. The electrode paste was applied to an aluminum foil (thickness of 18 μm) by a doctor blade (300 μm), dried at 200° C. for 15 minutes to obtain an electrode plate.

The produced electrode plate was cut into a diameter of 15.9 mm to obtain a positive electrode; a lithium foil cut into a diameter of 16.1 mm and a thickness of 0.2 mm was used as a negative electrode; Celgard #2400 (manufactured by Celgard) cut into a diameter of 17 mm was used as a separator; and a solvent of ethylene carbonate:diethyl carbonate=7:3, which contains 1 M of LiPF6, was used as an electrolytic solution to produce a 2042 type coin battery, and the electrochemical evaluation was carried out. Charge/discharge measurement was carried out three times at a rate of 1C, an upper limit voltage of 4.0 V, and a lower limit voltage of 2.5 V and the capacity at the time of the third discharge was defined as a discharge capacity.

Synthetic Example 1

Production method of graphene oxide: a natural graphite powder with 1500 mesh (Shanghai Yifan Graphite Co., Ltd.) was used as a raw material, and 220 ml of 98% concentrated sulfuric acid, 5 g of sodium nitrate, and 30 g of potassium permanganate were added to 10 g of the natural graphite powder in an ice bath and the mixed liquid was mechanically stirred for 1 hour and the temperature of the mixed liquid was kept at 20° C. or lower. The above-mentioned mixed liquid was taken out of the ice bath and subjected to a reaction while being stirred for 4 hours in a water bath at 35° C. and thereafter, 500 ml of ion exchanged water was added thereto and the obtained suspension liquid was subjected to a reaction at 90° C. for another 15 minutes. Finally, 600 ml of ion exchanged water and 50 ml of hydrogen peroxide were added thereto and a reaction was carried out for 5 minutes to obtain a graphene oxide dispersion liquid. The obtained dispersion liquid was filtered while being hot, metal ions were washed with a diluted hydrochloric acid solution, the acid was washed with ion exchanged water and the washing was repeated until pH became 7 to produce graphene oxide gel. The elemental ratio of oxygen atoms to carbon atoms in the produced graphene oxide gel was 0.53.

Synthetic Example 2

Graphene oxide gel was produced in the same manner as in Synthetic Example 1, except that the ratio of the amounts of the sodium nitrate and the potassium permanganate to the graphite were changed to 55% of those in Synthetic Example 1. The elemental ratio of oxygen atoms to carbon atoms in the produced graphene oxide gel was 0.44.

Synthetic Example 3

Graphene oxide gel was produced in the same manner as in Synthetic Example 1, except that the ratio of the amounts of the sodium nitrate and the potassium permanganate to the graphite were changed to 70% of those in Synthetic Example 1. The elemental ratio of oxygen atoms to carbon atoms in the produced graphene oxide gel was 0.45.

Synthetic Example 4

Graphene oxide gel was produced in the same manner as in Synthetic Example 1, except that the ratio of the amounts of the sodium nitrate and the potassium permanganate to the graphite were changed to 85% of those in Synthetic Example 1. The elemental ratio of oxygen atoms to carbon atoms in the produced graphene oxide gel was 0.47.

Example 1

(1) Production method of graphene oxide dispersion liquid: The graphene oxide gel produced in Synthetic Example 1 was diluted with deionized water to a concentration of 10 mg/ml and subjected to ultrasonic treatment to obtain an ocher and evenly dispersed graphene oxide dispersion liquid.

(2) Production method of graphene powder: A graphene powder was obtained by adding 3 g of sodium dithionite as a reducing agent to 100 ml of the graphene oxide dispersion liquid, and carrying out a reduction reaction at a reduction reaction temperature of 23° C., room temperature, for a reduction reaction time of 5 minutes using a mechanical stirrer, followed by filtration, water washing, and drying.

(3) Physical properties and performance of graphene

The elemental ratio of oxygen atoms to carbon atoms in the produced graphene powder was 0.10 and the elemental ratio of nitrogen atoms to carbon atoms was not detected and it was not more than 0.001. The produced graphene powder was measured according to (Measurement Example 2) Raman spectroscopy to find that the ID/IG value was 1.50 and the I2D/IG value was 0.14. The produced graphene powder was measured according to (Measurement Example 3) IR spectroscopy to find that the area ratio of the peak derived from a C=O bond to the peak derived from a C=C bond was 0.18. The conductivity of the graphene oxide before reduction was $6.7 \times 10^{-6}$ S/m and the conductivity of the graphene powder after reduction was $4.4 \times 10^2$ S/m. The results are collectively shown in Table 1.

An electrode paste containing the graphene powder for a lithium ion battery was produced according to Measurement Example 5 and the yield value was measured to find that it was 4.5 Pa. An electrode plate was produced according to Measurement Example 6 using the paste and the discharge capacity was measured to find that it was 154 mAh/g. The results are collectively shown in Table 2.

Example 2

(1) Production method of graphene oxide dispersion liquid: The graphene oxide gel produced in Synthetic Example 1 was diluted with deionized water/N,N-dimethylformamide at a volume ratio of 1:1 to a concentration of 10 mg/ml and subjected to ultrasonic treatment to obtain an ocher and evenly dispersed graphene oxide dispersion liquid.

(2) Production method of graphene powder: A graphene powder was obtained by adding 1 g of sodium dithionite as a reducing agent to 100 ml of the graphene oxide dispersion liquid, and carrying out a reduction reaction at a reduction reaction temperature of 30° C. for a reduction reaction time of 1 minute using a mechanical stirrer, followed by filtration, water washing, and drying.

(3) Physical properties and performance of graphene: The produced graphene powder was measured by XPS measurement and as a result, the elemental ratio of oxygen atoms to carbon atoms was 0.11. The elemental ratio of nitrogen atoms to carbon atoms was not detected and it was not more than 0.001. The produced graphene powder was measured by Raman spectroscopy to find that the ID/IG value was 1.32 and the I2D/IG value was 0.13. The produced graphene powder was subjected to IR absorptiometry to find that the area ratio of the peak derived from a C=O bond to the peak derived from a C=C bond was 0.42. The conductivity of the graphene oxide before reduction was $6.7 \times 10^{-6}$ S/m and the conductivity of the graphene powder after reduction was $1.7 \times 10^2$ S/m. The results are collectively shown in Table 1.

An electrode paste containing the graphene powder for a lithium ion battery was produced according to Measurement Example 5 and the yield value was measured to find that it was 8.4 Pa. An electrode plate was produced according to Measurement Example 6 using the paste and the discharge capacity was measured to find that it was 145 mAh/g. The results are collectively shown in Table 2.

Example 3

A graphene powder was obtained by adding 2 g of sodium dithionite as a reducing agent to 100 ml of the graphene oxide dispersion liquid of Example 1, and carrying out a reduction reaction at a reduction reaction temperature of 50° C. for a reduction reaction time of 1 hour using a mechanical stirrer, followed by filtration, water washing, and drying.

The produced graphene powder was measured by XPS measurement and as a result, the elemental ratio of oxygen atoms to carbon atoms was 0.10. The elemental ratio of nitrogen atoms to carbon atoms was not detected and it was not more than 0.001. The produced graphene powder was measured by Raman spectroscopy to find that the ID/IG value was 1.67 and the I2D/IG value was 0.17. The produced graphene powder was subjected to IR absorptiometry to find that the area ratio of the peak derived from a C=O bond to the peak derived from a C=C bond was 0.23.

The conductivity of the graphene oxide before reduction was 6.7×10-6 S/m and the conductivity of the graphene powder after reduction was 6.2×102 S/m. The results are collectively shown in Table 1.

An electrode paste containing the graphene powder for a lithium ion battery was produced according to Measurement Example 5 and the yield stress was measured to find that it was 10.3 Pa. An electrode plate was produced according to Measurement Example 6 using the paste and the discharge capacity was measured to find that it was 139 mAh/g. The results are collectively shown in Table 2.

Example 4

A graphene powder was obtained in the same operation as in Example 1, except that the reduction reaction time was changed to 1 hour. The elemental ratio of oxygen atoms to carbon atoms, the elemental ratio of nitrogen atoms to carbon atoms, Raman spectroscopy, IR absorptiometry, and conductivity before and after reduction were measured in the same manner as in Example 1. The results are shown in Table 1. The yield stress measurement and the discharge capacity measurement were carried out in the same manner as in Example 1. The results are shown in Table 2.

Example 5

A graphene powder was obtained in the same operation as in Example 1, except that the reduction reaction temperature was changed to 90° C. The elemental ratio of oxygen atoms to carbon atoms, the elemental ratio of nitrogen atoms to carbon atoms, Raman spectroscopy, IR absorptiometry, and conductivity before and after reduction were measured in the same manner as in Example 1. The results are shown in Table 1. The yield stress measurement and the discharge capacity measurement were carried out in the same manner as in Example 1. The results are shown in Table 2.

Example 6

A graphene powder was obtained in the same operation as in Example 1, except that potassium dithionite was used as a reducing agent. The elemental ratio of oxygen atoms to carbon atoms, the elemental ratio of nitrogen atoms to carbon atoms, Raman spectroscopy, IR absorptiometry, and conductivity before and after reduction were measured in the same manner as in Example 1. The results are shown in Table 1. The yield stress measurement and the discharge capacity measurement were carried out in the same manner as in Example 1. The results are shown in Table 2.

Example 7

A graphene powder was obtained in the same operation as in Example 4, except that potassium dithionite was used as a reducing agent and the reduction reaction time was changed to 1 hour. The elemental ratio of oxygen atoms to carbon atoms, the elemental ratio of nitrogen atoms to carbon atoms, Raman spectroscopy, IR absorptiometry, and conductivity before and after reduction were measured in the same manner as in Example 1. The results are shown in Table 1. The yield stress measurement and the discharge capacity measurement were carried out in the same manner as in Example 1. The results are shown in Table 2.

Example 8

A graphene powder was obtained in the same operation as in Example 1, except that the graphene oxide produced in Synthesis Example 2 was used. The elemental ratio of oxygen atoms to carbon atoms, the elemental ratio of nitrogen atoms to carbon atoms, Raman spectroscopy, IR absorptiometry, and conductivity before and after reduction were measured in the same manner as in Example 1. The results are shown in Table 1. The yield stress measurement and the discharge capacity measurement were carried out in the same manner as in Example 1. The results are shown in Table 2.

Example 9

A graphene powder was obtained in the same operation as in Example 1, except that the graphene oxide produced in Synthesis Example 4 was used. The elemental ratio of oxygen atoms to carbon atoms, the elemental ratio of nitrogen atoms to carbon atoms, Raman spectroscopy, IR absorptiometry, and conductivity before and after reduction were measured in the same manner as in Example 1. The results are shown in Table 1. The yield stress measurement and the discharge capacity measurement were carried out in the same manner as in Example 1. The results are shown in Table 2.

Example 10

A graphene powder was obtained in the same operation as in Example 1, except that the graphene oxide produced in Synthesis Example 3 was used. The elemental ratio of oxygen atoms to carbon atoms, the elemental ratio of nitrogen atoms to carbon atoms, Raman spectroscopy, IR absorptiometry, and conductivity before and after reduction were measured in the same manner as in Example 1. The results are shown in Table 1. The yield stress measurement and the discharge capacity measurement were carried out in the same manner as in Example 1. The results are shown in Table 2.

Comparative Example 1

A substance was obtained in the same operation as in Example 1, except that sodium hydrogen carbonate was used in place of the sodium dithionite as a reducing agent. The conductivity of the produced substance was almost the same as that of graphene oxide and the graphite oxide was not reduced.

Comparative Example 2

A graphene powder was obtained by adding 3 g of sodium hydrogen sulfite as a reducing agent to 100 ml of the graphene oxide dispersion liquid of Example 1, and carrying out a reduction reaction at a reduction reaction temperature of 90° C. for a reduction reaction time of 2 hours using a mechanical stirrer, followed by filtration, water washing, and drying.

The elemental ratio of oxygen atoms to carbon atoms, the elemental ratio of nitrogen atoms to carbon atoms, Raman spectroscopy, and IR absorptiometry were measured in the same manner as in Example 1. The conductivity of the graphene oxide before reduction was 6.7×10-6 S/m and the conductivity of the graphene powder after reduction was 8.1× 101 S/m. The results are shown in Table 1. The yield stress measurement and the discharge capacity measurement were carried out in the same manner as in Example 1. The results are shown in Table 2.

Comparative Example 3

A graphene powder was obtained by adding 4 g of urea as a reducing agent to 100 ml of the graphene oxide dispersion liquid of Example 1, and carrying out a reduction reaction at a reduction reaction temperature of 100° C. for a reduction reaction time of 3 days using a mechanical stirrer, followed by filtration, water washing, and drying.

The elemental ratio of oxygen atoms to carbon atoms, the elemental ratio of nitrogen atoms to carbon atoms, Raman spectroscopy, and IR absorptiometry were measured in the same manner as in Example 1. The conductivity of the graphene oxide before reduction was $6.7 \times 10^{-6}$ S/m and the conductivity of the graphene powder after reduction was $6.2 \times 10^{-2}$ S/m. The results are shown in Table 1. The yield stress measurement and the discharge capacity measurement were carried out in the same manner as in Example 1. The results are shown in Table 2.

Comparative Example 4

A graphene powder was obtained by adding 2 g of hydrazine hydrate as a reducing agent to 100 ml of the graphene oxide dispersion liquid of Example 1, and carrying out a reduction reaction at a reduction reaction temperature of 100° C. for a reduction reaction time of 24 hours using a mechanical stirrer, followed by filtration, water washing, and drying.

The elemental ratio of oxygen atoms to carbon atoms, the elemental ratio of nitrogen atoms to carbon atoms, Raman spectroscopy, and IR absorptiometry were measured in the same manner as in Example 1. The conductivity of the graphene oxide before reduction was $6.7 \times 10^{-6}$ S/m and the conductivity of the graphene powder after reduction was $3.1 \times 10^2$ S/m. The results are shown in Table 1. The yield stress measurement and the discharge capacity measurement were carried out in the same manner as in Example 1. The results are shown in Table 2.

Comparative Example 5

A graphene powder was obtained by reducing the graphene oxide produced in Synthesis Example 1 through heating to 1000° C. in an argon atmosphere. The elemental ratio of oxygen atoms to carbon atoms, the elemental ratio of nitrogen atoms to carbon atoms, Raman spectroscopy, IR absorptiometry, and conductivity before and after reduction were measured in the same manner as in Example 1. The results are shown in Table 1. The yield stress measurement and the discharge capacity measurement were carried out in the same manner as in Example 1. The results are shown in Table 2.

Comparative Example 6

The elemental ratio of oxygen atoms to carbon atoms, the elemental ratio of nitrogen atoms to carbon atoms, Raman spectroscopy, IR absorptiometry, and conductivity were measured in the same manner as in Example 1 for a graphite nano-platelet (Model No. M-5, manufactured by XG Science). The results are shown in Table 1. The yield stress measurement and the discharge capacity measurement were carried out in the same manner as in Example 1. The results are shown in Table 2.

As described above, a graphene powder with a ratio of oxygen atoms to carbon atoms of not less than 0.07 and not more than 0.13 and a ratio of nitrogen atoms to carbon atoms of not more than 0.01 has high conductivity, good dispersibility, and a low yield value and therefore, it is excellent in performance as a conductive additive and gives high discharge capacity.

Further, with respect to the structure defect of graphene, a graphene powder with an ID/IG within a range of not less than 1 and not more than 2 by Raman measurement was found to give good results.

Such a graphene powder is easy to be obtained when it is produced by reducing graphene oxide using particularly sodium dithionite and it is found from examples and comparative examples that such a graphene powder is hard to be obtained by conventional hydrazine reduction or heat reduction.

TABLE 1

|  | Properties of graphene | | | | | Graphene conductivity (S/m) | |
| --- | --- | --- | --- | --- | --- | --- | --- |
|  | O/C Ratio (XPS) | N/C Ratio (XPS) | ID/IG (Raman) | I2D/IG (Raman) | (C=O/C=C) IR | Before reduction | After reduction |
| Example 1 | 0.1 | 0 | 1.5 | 0.14 | 0.18 | 6.70E−06 | 4.40E+02 |
| Example 2 | 0.11 | 0 | 1.32 | 0.13 | 0.42 | 6.70E−06 | 1.70E+02 |
| Example 3 | 0.1 | 0 | 1.67 | 0.17 | 0.23 | 6.70E−06 | 6.20E+02 |
| Example 4 | 0.09 | 0 | 1.47 | 0.18 | 0.36 | 6.70E−06 | 6.40E+02 |
| Example 5 | 0.08 | 0 | 1.21 | 0.2 | 0.12 | 6.70E−06 | 5.50E+02 |
| Example 6 | 0.13 | 0 | 1.62 | 0.26 | 0.3 | 6.70E−06 | 2.20E+02 |
| Example 7 | 0.12 | 0 | 1.55 | 0.24 | 0.24 | 6.70E−06 | 3.20E+02 |
| Example 8 | 0.09 | 0 | 1.47 | 0.18 | 0.22 | 3.60E−06 | 1.96E+03 |
| Example 9 | 0.09 | 0 | 1.48 | 0.15 | 0.23 | 4.60E−06 | 9.83E+02 |
| Example 10 | 0.09 | 0 | 1.46 | 0.17 | 0.25 | 5.30E−06 | 1.43E+03 |
| Comparative Example 1 | 0.32 | 0 | — | — | — | 6.70E−06 | — |
| Comparative Example 2 | 0.24 | 0 | 2.14 | 0.14 | 0.42 | 6.70E−06 | 8.10E+01 |
| Comparative Example 3 | 0.32 | 0 | 2.76 | 0.26 | 0.65 | 6.70E−06 | 6.20E−02 |
| Comparative Example 4 | 0.074 | 0.034 | 1.28 | 0.12 | 0.07 | 6.70E−06 | 3.10E+02 |
| Comparative Example 5 | 0.13 | 0 | 0.8 | 0.09 | 0.32 | 6.70E−06 | 4.90E+02 |
| Comparative Example 6 | 0.04 | 0 | 0.37 | 0.25 | 0.05 | — | 2.95E+03 |

TABLE 2

|  | Yield value (Pa) | Discharge capacity (mAh/g) |
| --- | --- | --- |
| Example 1 | 4.5 | 152 |
| Example 2 | 8.4 | 145 |
| Example 3 | 10.3 | 139 |
| Example 4 | 8.1 | 150 |
| Example 5 | 12.3 | 136 |
| Example 6 | 3.2 | 138 |
| Example 7 | 4.6 | 139 |
| Example 8 | 8.2 | 153 |
| Example 9 | 6.9 | 151 |
| Example 10 | 5.7 | 152 |
| Comparative Example 1 | — | — |
| Comparative Example 2 | 10.1 | 95 |
| Comparative Example 3 | 2.3 | 45 |
| Comparative Example 4 | 25.6 | 101 |
| Comparative Example 5 | 82.4 | 121 |
| Comparative Example 6 | 54.1 | 128 |

The invention claimed is:

1. A graphene powder having an elemental ratio of oxygen atoms to carbon atoms of not less than 0.07 and not more than 0.13 and an elemental ratio of nitrogen atoms to carbon atoms of not more than 0.01,
wherein a ratio of $I_D$ peak intensity $I_G$ peak intensity measured by Raman spectroscopy which is measured at an excitation wavelength of 514.5 nm using argon ion laser excitation laser is not less than 1 and not more than 2.

2. The graphene powder according to claim 1, wherein a ratio of $I_{2D}$ peak intensity to $I_G$ peak intensity measured by Raman spectroscopy which is measured at an excitation wavelength of 514.5 nm using argon ion laser as excitation laser is not less than 0.1 and not more than 0.2.

3. The graphene powder according to claim 1, wherein the graphene powder comprises flakes of the graphene powder.

4. The graphene powder according to claim 3, wherein a thickness of the flakes is no more than 100 nm.

5. The graphene powder according to claim 3, wherein a thickness of the flakes is no more than 50 nm.

6. A graphene powder having an elemental ratio of oxygen atoms to carbon atoms of not less than 0.07 and not more than 0.13 and an elemental ratio of nitrogen atoms to carbon atoms of not more than 0.01, wherein a ratio of the peak area at around 1750 cm$^{-1}$ derived from a carbonyl group to the peak area at around 1560 cm$^{-1}$ derived from a carbon-carbon double bond measured by IR spectroscopy which is carried out by ATR method is not less than 0.1 and not more than 0.5.

7. A method for producing a graphene powder comprising reducing graphene oxide using a reducing agent, wherein a dithionous acid salt is used as the reducing agent wherein the elemental ratio of oxygen atoms to carbon atoms in graphene oxide is not more than 0.5 and no peak peculiar to graphite is detected in an x-ray diffraction spectrum of the graphene oxide.

8. The method for producing a graphene powder according to claim 7, wherein the dithionous acid salt is sodium dithionite or potassium dithionite.

9. An electrochemical device comprising the graphene powder according to claim 1.

10. The electrochemical device according to claim 9, wherein the electrochemical device comprises a lithium ion secondary battery.

11. A graphene powder comprising oxygen and carbon, wherein the graphene powder comprises flakes of the graphene powder and wherein the elemental ratio of oxygen atoms to carbon atoms in graphene oxide is not more than 0.5 and no peak peculiar to graphite is detected in an x-ray diffraction spectrum of the graphene oxide.

12. The graphene powder according to claim 11, wherein a thickness of the flakes is no more than 50 nm.

13. The graphene powder of claim 11, wherein a thickness of the flakes is no more than 100 nm.

14. An electrochemical device comprising the graphene powder according to claim 11.

15. The electrochemical device according to claim 14, wherein the electrochemical device comprises a lithium ion secondary battery.

16. An electrochemical device comprising the graphene powder according to claim 11.

17. The electrochemical device according to claim 16, wherein the electrochemical device comprises a lithium ion secondary battery.

18. An electrochemical device comprising the graphene powder according to claim 11, wherein the electrochemical device comprises a lithium ion secondary battery.

19. A graphene powder having an elemental ratio of oxygen atoms to carbon atoms of not less than 0.07 and not more than 0.13 and an elemental ratio of nitrogen atoms to carbon atoms of not more than 0.01, wherein the graphene powder is prepared by a method for producing the graphene powder comprising reducing graphene oxide using a reducing agent, wherein a dithionous acid salt is used as the reducing agent wherein the elemental ratio of oxygen atoms to carbon atoms in graphene oxide is not more than 0.5 and no peak peculiar to graphite is detected in an x-ray diffraction spectrum of the graphene oxide.

* * * * *